United States Patent [19]

Sauer et al.

[11] 4,139,683
[45] Feb. 13, 1979

[54] GALVANIC ELEMENT WITH NEGATIVE LIGHT METAL OR ZINC ELECTRODE

[75] Inventors: Hans Sauer, Idstein-Walsdorf; Hans-Martin Lippold, Glashütten; Dieter Spahrbier, Fischbach, all of Fed. Rep. of Germany

[73] Assignee: Varta Batterie Aktiengesellschaft, Hanover, Fed. Rep. of Germany

[21] Appl. No.: 865,225

[22] Filed: Dec. 28, 1977

[30] Foreign Application Priority Data

Feb. 26, 1977 [DE] Fed. Rep. of Germany ....... 2708372
Oct. 15, 1977 [DE] Fed. Rep. of Germany ....... 2746590

[51] Int. Cl.$^2$ .................................................. H01M 4/34
[52] U.S. Cl. .................................... 429/219; 429/221; 429/223; 429/228

[58] Field of Search ............... 429/219, 221, 228, 223, 429/229–231

[56] References Cited

U.S. PATENT DOCUMENTS

| 3,920,478 | 11/1975 | Kozawa ........................... 429/229 X |
| 3,925,102 | 12/1975 | Kozawa ........................... 429/219 X |
| 3,990,916 | 11/1976 | Sugimoto et al. ................ 429/219 X |
| 4,038,467 | 7/1977 | Lippold .............................. 429/219 |
| 4,056,664 | 11/1977 | Jaffe ................................ 429/219 X |

Primary Examiner—Charles F. LeFevour
Attorney, Agent, or Firm—Weiser, Stapler & Spivak

[57] ABSTRACT

The positive electrode consisting of the chalcogenide of an at least bi-valent metal is connected to the positive current take-off solely through an electrically conductive connector having an exceptionally small contact area with the higher valent metal.

12 Claims, 6 Drawing Figures

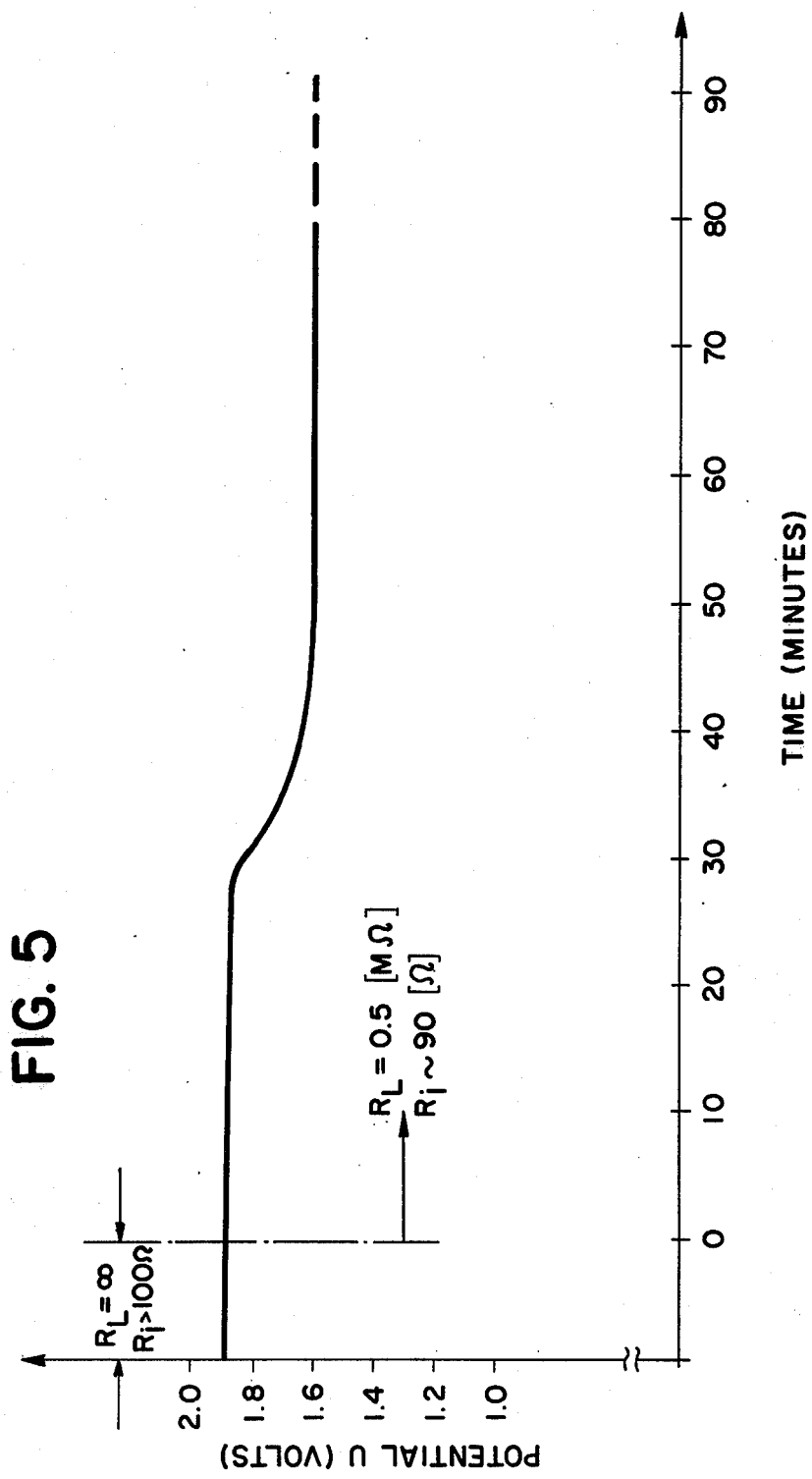

GALVANIC ELEMENT WITH NEGATIVE LIGHT METAL OR ZINC ELECTRODE

The invention relates to a galvanic element with negative light metal or zinc electrode and with a positive electrode insulated from the positive take-off conductor by an electrically non-conductive synthetic plastic of the chalcogenide of an least bi-valent metal which discharges in at least two steps, the discharge potential corresponding to the higher valent metal chalcogenide being supressed during use of the cell.

In galvanic cells having, for example, a negative zinc electrode and a positive metal oxide electrode in an alkaline electrolyte, uncontrolled fluctuations in terminal voltage during discharge are frequently observed. Their cause resides in the fact that the active positive mass ordinarily has no unitary oxide phase, but rather is composed of several oxides of the same metal when this is capable of assuming several valences relative to hydrogen. Therefore, when dealing with a positive metal oxide electrode, there is basically involved a mixed oxide system of the general type $MeO_x/MeO_y$, wherein $x > y$ and consequently $MeO_x$ is the higher valent oxide. In order to achieve during discharge the greatest possible coulomb yield, pure $MeO_x$ is preferably used as the positive electrode material. By the same token, in the zero-current state of the cell or during light loading, there exists a potential which is determined by the potential of the higher valent oxide, and more specifically by the potential of a resultant $MeO_x/MeO_y$ redox electrode. Thus, right at the beginning of the discharge, a mixed oxide system is present in which the higher valent oxide is more readily reduced than the lower valent one, the latter thereby being the stabilizing one. Characteristic of such a mixed oxide system is a voltage drop to a potential corresponding to the $MeO_y$/Me-redox electrode, particularly at a point in time in the course of discharge at which the higher valent oxide $MeO_x$ has not yet been consumed. Further it is characteristic that the mixed oxide system gives rise, at the stage at which the discharge is interrupted, also only to a rest potential corresponding to the $MeO_y$/Me electrode, despite the counter-valent $MeO_x$.

The lower voltage step is not necessarily contingent upon the presence of an $MeO_y$/Me electrode. Thus when the oxide is not susceptible of discharge to the stage of the pure metal, a redox electrode of type $MeO_y/MeO_z$, in which $y > z$, can also determine the lower voltage plateau. In that case, the oxide phase $MeO_z$, the end product of the discharge, must of course have good self-conductivity. Frequently, definite semiconductors exist in these oxygen-poor oxide phases.

The scheme of reduction of higher metal oxides via mixed oxide steps gains a more general significance from the fact that it is also valid for metal sulfites with homolog properties. Concepts such as oxidation step or redox electrode, which otherwise apply only to hydrogen compounds, are therefore to be understood in the more far-reaching sense as meaning only the valences relative to the compound partner (oxygen or sulfur) which are activated by the metal.

Due to the variable voltage value of known cells it has heretofore not been possible to assure trouble-free energy supply for certain electrically powered equipment with high sensitivity to voltage variations.

The most experience in this regard involves silver/zinc cells. For that reason the state of affairs described in general terms above will be described in what follows by reference to the AgO/Zn system. Because of its high energy density this system is particularly suitable for the operation of electronic wristwatches. More precisely its positive electrode also constitutes a mixed oxide of the composition $AgO/Ag_2O$. This is the reason why the discharge of cells depending upon their current loading takes place only during about the first third of the discharge period at a potential of 1.8 volts, while the remaining discharge takes place at potentials below 1.6 volts, corresponding to the $Ag_2O/Zn$ system. The discharge is therefore associated with a potential step of about 250 millivolts, which would discernibly disturb the uniform operation of an electronically operated watch.

Efforts have therefore long been made to provide a discharge which occurs stepless at the lower potential level of 1.6 volts, while simultaneously fully utilizing the capacity of the bi-valent silver oxide employed.

Practical approaches to this objective have been pointed out particularly by T. P. Dirkse (J. Elektrochem. Soc. 109 (1962) 3, pages 173 to 177). He found that the no-load potential of AgO tablets indeed corresponded to the $Ag_2O/Ag$ system when they had previously been subjected to a partial electrochemical discharge.

Since that time many proposals have been made for producing upon an AgO tablet a thin layer of $Ag_2O$, as by reduction through chemcial means or through application under pressure so that in the no-load state, too, the lower cell potential of the $Ag_2O/Zn$ system exists when in addition to the $Ag_2O$, metallic Ag is also present at the take-off conductor. For the take-off conductor, the bi-valent silver oxide which is the actual active electrode substance, is masked so to speak, and only the cover layer of Ag and $Ag_2O$ immediately adjacent to it determines the potential.

Cells based on the above have the advantage, independently of their specific configuration, that the desired operating potential is immediately available at the lower potential level of 1.6 volts. By reduction the voltage is stabilized at the stage of the $Ag_2O/Zn$ system whereby direct interchange with that system is also possible.

On the other hand, the necessary surface reduction of the AgO, as well as the deformation of the tablet which is frequently unavoidable during assembly, has an adverse influence upon the stabilized cell. The surface reduction deprives the electrode of a significant fraction of its AgO capacity and also represents an additional manufacturing process. Upon deformation the $Ag_2O$ layer breaks open, so that there no longer exists a separation between AgO and Ag but rather an electrolytically conductive connection and a corrosion current is enabled to flow within the silver oxide electrode. This has the consequence that the metallic silver is oxidized to $Ag_2O$ at the contact surface and the AgO is reduced to $Ag_2O$.

If the surface of the metallic silver is small relative to the surface of the AgO, then the Ag is ultimately oxidized entirely to $Ag_2O$, whereas a portion of the AgO surface remains in existence so that at the contact there is now present instead of the $Ag_2O$/Ag electrode an $AgO/Ag_2O$ electrode. Correspondingly, with progressive corrosion reaction, the cell will exhibit intermediate potential values between 1.6 volts and 1.85 volts and, at the end, assume the undesired high potential of the AgO/Zn system.

In practical embodiments of these cells account has also been taken of the trend to size reduction of the electronic wristwatches, which is possible only if the cells are also made smaller. In a button cell with the desired dimensions of, for example, 7.9mm $\phi \times$ 2.1mm, the useful volume relative to the inactive structural elements such as housing, separator, etc. is already so small that the energy richer AgO/Zn system stabilized at 1.6 volts no longer has an appreciable advantage over the $Ag_2O/Zn$ system because a substantial portion of its capacity is lost due to the requirement for surface reduction of the AgO.

In accordance with German patent publication (DT-OS) No. 2,506,399, it is possible to keep these capacity losses within limits by fitting the positive AgO electrode tablet into a synthetic plastic cup which insulates it from the metal cup constituting the positive take-off conductor, and therefore exposes only the open side of the tablet to a chemical reduction treatment before assembly. The electrical contact of the positive mass with the metal cup is provided by a contact ring resting upon the open tablet edge.

Through this contact ring the surface reduction of the AgO tablet can be accomplished, after manufacture of the cell, by a suitably proportioned cathodic current.

This construction does not alter the operating principle of the stabilized AgO/Zn cell because, as before, the AgO electrode is covered on the contact side with $Ag_2O$ of which again a portion directly at the contact surface is reduced to Ag so that an $Ag_2O/Ag$ electrode is electrochemically achieved and the cell potential is a 1.6 volts.

Insofar as the obtaining of the highest possible useful capacity during the above-mentioned minaturization of the cell is concerned, the measures heretofore taken have not yet yielded a decisive breakthrough.

The same problem of voltage stabilization exists for known cells with positive bismuth oxide electrodes, a negative lithium electrode, and an organic electrolyte because, here too, there is involved a mixed oxide of the type $Bi_2O_x/Bi_2O_3$, wherein x = 5 or 4 and the decomposition of the higher bismuth oxide $Bi_2O_x$ during the initial discharge phase is associated with a higher potential level. The excess initial potential of more than 600 millivolts relative to the normal discharge potential of a $Bi_2O_3/Bi$ electrode is very detrimental. It is encountered even in electrodes of commercial $Bi_2O_3$ because these are rarely free of higher oxidized bismuth.

Chemical and electrochemical treatments which, in the case of silver oxides, did lead to a certain amount of success in the striving towards single step fixed discharge characteristic are not directly applicable to bismuth oxide electrodes. Similar difficulties arise in many other electrochemical systems.

Accordingly, it is an object of the invention, given an electrochemical system with a positive metal chalcogenide electrode in which the metal is present in several valence states, to take structural measures such that during discharge only that voltage occurs which corresponds to the potential of the respective lower, or stabilizing metal chalcogenide. Nevertheless, the entire electrode capacity is used at very low current draws, e.g. in the range of 15 microamperes or less.

This and other objects which will appear are achieved in accordance with the invention by placing the positive electrode in contact with the positive take-off conductor only through an electrically conductive connector whose contact surface with the electrode consisting of the higher valent chalcogenide is so small that, even at current yields of less than 15 microamperes, the reduction of the chalcogen compound determining the lower discharge potential into a chalcogen-poorest phase or down to the metal takes place at the connector more rapidly than the oxidation of that metal or of that chalcogen-poorest phase into the higher metal chalcogenide with which it is electrolytically conductively connected.

In accordance with the invention the positive electrode is therefore separated from the cell container by an electrically non-conductive layer. This positive electrode consists of a metal compound (oxide or sulfide) which during discharge traverses several (at least two) potential steps. If such an electrode is provided with a conventional large-surface connector as take-off conductor, these steps manifest themselves clearly in the discharge voltage curve, particularly in the event that the discharge current is low. In accordance with the invention the contact surface is therefore so dimensioned that the higher discharge potential is supressed so that the cell discharges at a single voltage level at which moreover the capacity is fully utilized. During discharge with very low currents (below 15 microamperes) there immediately forms at the current takeoff connector the potential-determining metal compound from the higher valent metal compound, and this potential determining metal compound is reduced to a chalcogen-poorest compound or to the metal. Due to the small contact surface, the rate of formation of the chalcogen-poorest compound at the connector is higher than the possible upward oxidation of this compound through the electrolytically conductively connected higher valent chalcogenide compound.

It is important for the invention that the contact surface between the connector and the electrode body be so small that at a current of a few microamperes comparatively high current densities of several mA . $10^{-1}/cm^2$ occur at the connector. This dimensional requirement is imposed in consideration of the background of the inventive subject matter for small size watch cells. However, its significance is generally valid, particularly for all mixed oxide electrodes of the type $MeO_x/MeO_y$, and in principle generally for metal chalcogenide electrodes.

The surprising results of the measures embodying the invention can again be demonstrated by illustration with a silver oxide electrode: given the condition that at current yields of 0.2 to 15 microamperes at the micro connector current densities of several mA . $10^{-1}/cm^2$ occur, the cathodic current density which there prevails is high enough to relatively rapidly reduce the next adjacent AgO powder to $Ag_2O$ and then to Ag. At the same time the formation rate of metallic silver at the contact must be greater than the rate of its oxidation by the AgO with which the silver is in electrolytically conductive connection through the very thin, porous reduction layer of $Ag_2O$.

On the other hand, the current density must decrease in inverse proportion to the surface increase of the silver, and the formation of new silver slow down and conversely its oxidation by the AgO must be more and more strong. After a predetermined current flow, formation and oxidative decomposition of the silver are in equilibrium. This equilibrium is upset when due to too low a current load the cathodically formed silver is insufficient to replace the quantity which is oxidized during the same period and therefore completely disappears. In that case, only an AgO/Ag$_2$O electrode at the connector would be voltage-determining and the cell would exhibit the potential of the AgO/Zn system.

A practical embodiment of a cell embodying the invention may be obtained, for example, by replacing in the cell construction in accordance with German publication No. 2,506,399, the contact ring with a metal wire of 0.1mm thickness which diammetrically traverses the surface of the AgO tablet.

A button cell of dimensions 11.6mm $\phi$ × 3.6mm and provided with such a connector in accordance with the invention exhibited already after 2.5 hours at a load of 4 microamperes the 1.6 volt potential. Surprisingly the internal resistance decreased during the same period from 100 ohms to about 10 ohms.

In a smaller cell of 7.9mm $\phi$ × 2.1mm it took only 40 minutes for the potential to reach 1.6 volts.

If the larger cell is initially subjected to a current pulse of, for example, 16 mA × 2.5 minutes = 0.63 mAh, then there is subsequently observed a no-load voltage of 1.6 volts. This remains constant for several days. If thereafter a load resistance of, for example, 1.5 megohms is connected to the cell, which corresponds to about one-third the consumption of a quartz watch with LCD display, the potential remains until the end of discharge in the range of 1.5 to 1.6 volts.

By virtue of the measures embodying the invention the useful capacity of the above-mentioned 11.6mm $\phi$ × 3.6mm button cell is increased from 120 mAh to about 150 mAh, i.e. by about 25%. In this, the equivalent charge used up by the current pulse of less than 1 mAh represents a loss which is of no practical significance.

In cells of practical dimensions, the contact surface between the AgO powder of the electrode tablet and the connector should be 1mm$^2$ for extremely small load currents of about 2 microamperes, and 5mm$^2$ for higher currents up to 10 microamperes. This corresponds to a current density of about 0.2 mA/cm$^2$. Under these conditions, the initial high potential of 1.85 volts drops within 2.5 hours to 1.6 volts, so that subsequently the accuracy of the watch as determined by the cell is assured.

Thus, the requirements of watch cells are met by a very special construction. The operating principle of the microconnector which it has been sought to explain above by the presence of a dynamic equilibrium between two antagonistic processes, namely the formation of metallic silver at the contact surface and its corrosive transformation into Ag$_2$O, is surprising not only because the potential reduction takes place quickly, but because the internal resistance of the cell drops to 1/10 of the initial value.

Certain observations, conducted with known button cells according to German patent publication No. 2,506,399, point to the correctness of the assumptions concerning the effect of the microconnector: during discharge of such a cell with synthetic plastic-enclosed AgO electrode which however had not been surfaced reduced, the output potential of 1.85 volts fell to 1.6 volts after 1.5 months at a current of 4 microamperes. Thereafter, about 90% of the rated capacity was drawn at this voltage level. On the other hand, if the synthetic plastic enclosure insulating the metal cup was removed, a lower potential was assumed only after 6 months. These findings make it apparent that there must be a causal relationship between the time period which elapses during traversal of the voltage step and the manner of making contact.

For further details reference is made to the discussion which follows in the light of the accompanying drawings wherein:

FIG. 1b is a top view taken along line A—A in FIG. 1a;

FIG. 5 shows another operating characteristic of such cells.

The same reference numerals designate corresponding elements in the several Figures.

Figure 1A:
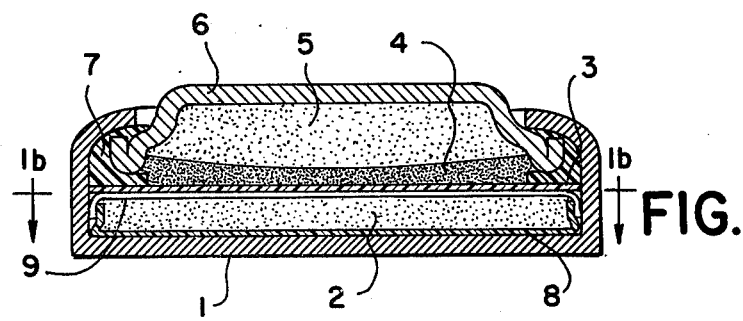
FIG. 1a is a cross-sectional view of a cell embodying the invention.
Figure 1B:
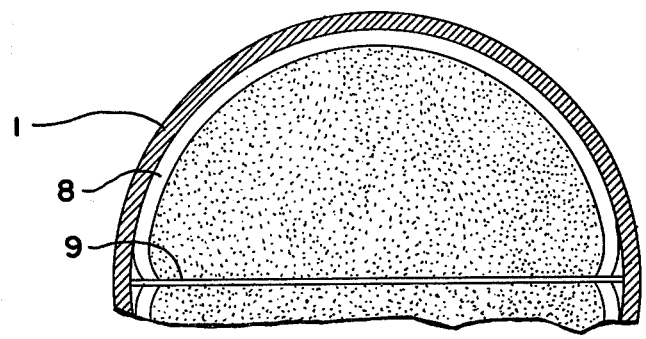

Referring to FIG. 1, this cell consists of a cell cup 1, the AgO mass 2, the separator 3, the electrolyte expansion sheet 4, the negative mass 5, the cell cover 6 and the sealing ring 7. The AgO electrode is insulated at its edge and bottom from cell cup 1 by a thin walled synthetic plastic cup 8, e.g. of Teflon. The connector between the AgO mass 2 and the cell cup 1 which simultaneously serves as the positive current take-off, is provided by an about 0.1mm thick metal wire 9 of pure silver or silvered nickel. It traverses the electrode surface diammetrically and is attached at its end between the edges of cell cup 1 and synthetic plastic cup 8. Instead of the wire extending across, the contacting can for example also be accomplished by means of one or more wire rods which extend from the cell cup into the interior of the electrode.

Figure 2:
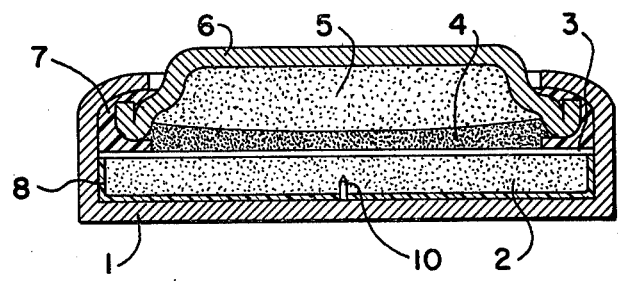
FIG. 2 is a cross-section of another embodiment of the invention.
Figure 3:
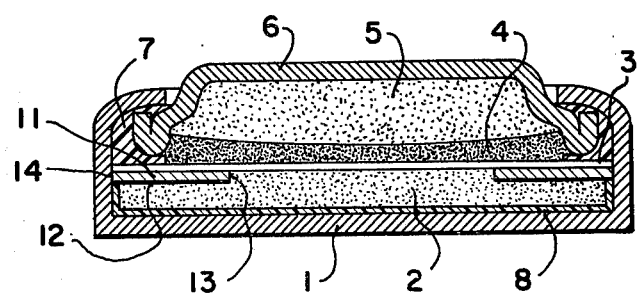
FIG. 3 is a cross-section of still another embodiment.

Two embodiments of the microconnector which are particularly advantageous from the manufacturing standpoint are illustrated in FIGS. 2 and 3. In accordance with FIG. 2, the connector consists of a metal wire rod attached to the bottom of the cell cup by welding. Upon pressing in of the AgO mass 2 it readily pierces the thin-walled synthetic plastic cup 8 and becomes firmly embedded in the AgO powder.

In accordance with FIG. 3, a ring-shaped disc 11 of pure silver sheet, whose bottom side is covered with an insulating layer 12, is sunk so deep into the AgO mass that it rests upon the edge of the synthetic plastic cup 8. In this way the disc 11 is in contact with the portion of the AgO mass exposed through the ring opening only along its inner edge 13 whereas its outer edge 14 is connected with metal cup 1 by frictional engagement and conductively.

Figure 4:
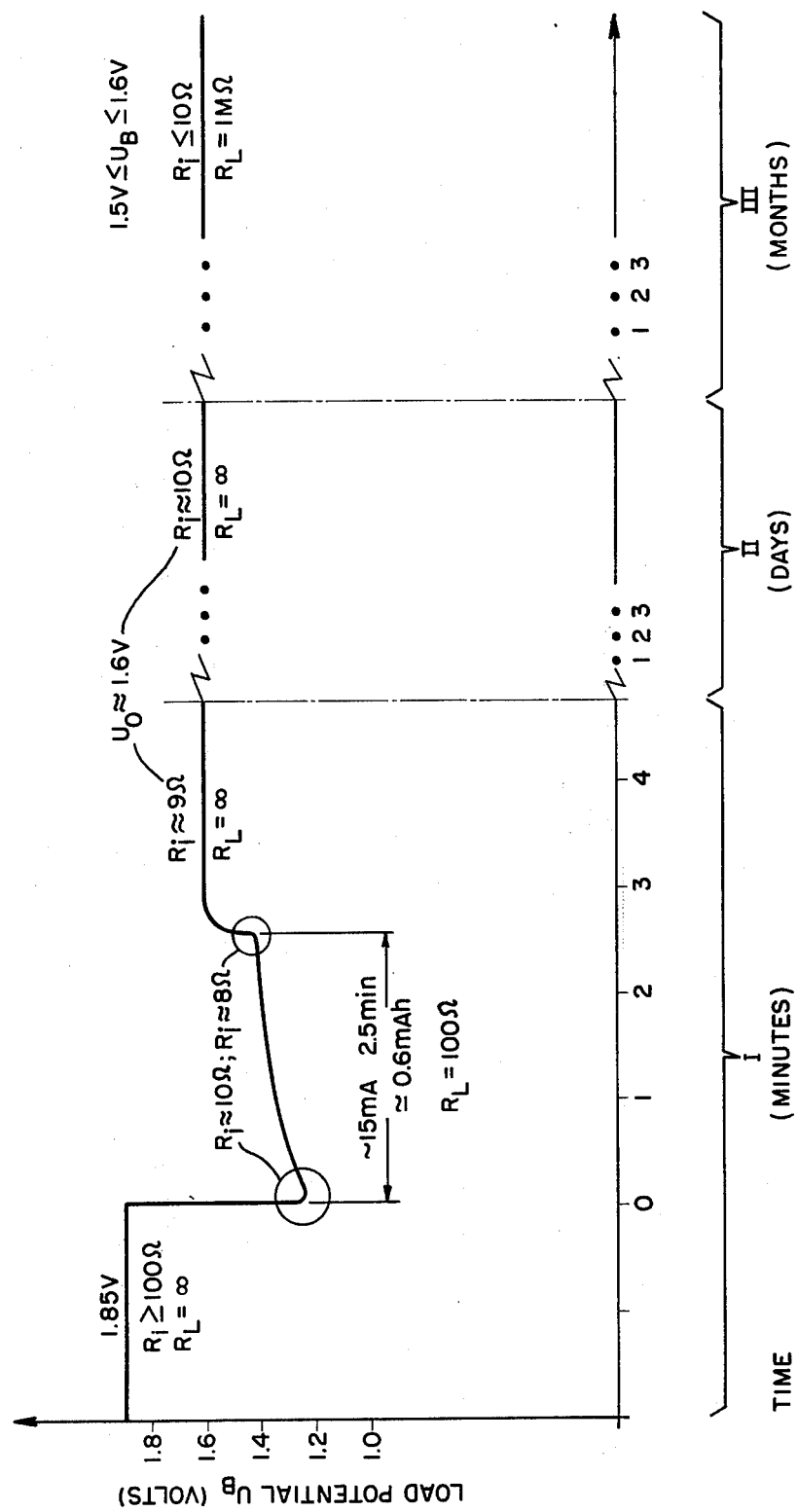
FIG. 4 is a graph showing the operating characteristic of cells embodying the invention.

FIG. 4 shows the variation with time of the voltage level in a cell embodying the invention. Region I along the time axis is divided into minute-long segments, region II into segments of days and region III into time segments of months. The cell is burnt in prior to being placed into operation at the point in time t = 0 minutes by reduction of the load resistance from $R_L = \infty$ to $R_L = 100$ ohms with a current i of intensity 12 to 14 mA for a period of 2.5 minutes. This pulse leads to a momentary drop in potential from 1.85 volts to 1.2 volts, but toward the end of the pulse loading (t = 2.5 minutes) it has already recovered to 1.4 volts. In the same time period the internal resistance of the cell goes from $R_i \gtrsim 100$ ohms (rest) through $R_i \approx 10$ ohms (t = 0 minutes) down to $R_i \approx 8$ ohms.

During a subsequent storage period of several days at no-load ($R_L = \infty$) a fixed constant rest potential $U_0$ of 1.6 volts is reached. At the same time the low internal resistance $R_i$ is substantially maintained.

If the cell is then discharged through a load resistance $R_L = 1$ megohm, the load potential $U_B$ remains during the entire months long discharge period always in the range of 1.5 to 1.6 volts.

In FIG. 5 there is shown the potential variation of a 7.9mm $\phi$ minature cell embodying the invention due to a simple application of a load resistance $R_L = 0.5$ megohm corresponding to a conventional load device. As shown the desired operating voltage of 1.6 volts has already been reached as a constant value after 40 minutes.

The advantages of the invention relative to known cells rest particularly in the fact that the required surface reduction of AgO in potential stabilized cells need no longer be performed as a separate manufacturing step, and in that the elimination of the surface reduction leaves a greater AgO-filled useful volume corresponding to an increase of more than 25% in useful capacity. At a current load of 0.2 to 15 microamperes, and particularly of 0.3 to 10 microamperes, the micro connector causes the rated potential of 1.6 volts to be achieved within 2.5 hours. This applies to a cell with the dimensions 11.6mm $\phi \times$ 3.6mm. By means of pulse loading, the drop of the cell potential from 1.85 to 1.6 volts can be reduced to a time period of minutes. A cell which has not been pretreated can also be inserted into the watch because the load corresponding to the setting of the correct time is equivalent to pulse loading, so that the desired operating potential of 1.6 volts is promptly available.

For LCD watches, just the current load of the electronics which is in the microampere range is sufficient to cause the cell to assume this potential within a few hours.

The no-load potential, i.e. rest potential of the as yet unused cell is 1.8 volts to 1.85 volts and this indicates that the cell still has its full capacity, i.e. has not yet been subjected to any use.

The preferred embodiments of the invention which have been explained at length with particular reference to the silver oxide/zinc system may be, in the same sense and with equal effectiveness, applied to other systems known in themselves, such as bismuth oxide/lithium or lead oxide, in particular red lead/lithium, both with organic electrolytes. In the latter case, the positive $Pb_3O_4$ electrode may be regarded as a $PbO_2/PbO$ system.

In addition, the range of application of the invention encompasses in place of oxidic electrode systems also sulfide systems such as $FeS_2/FeS$, $CoS_2/CoS$, $NiS_2/NiS$ with negative light metal (lithium) electrode and organic electrolyte. In these compositions the metals are not present in 4-valent form. However, as also in the intermediate sulfide compounds of the type $Me_3S_4$, they do occur at least partially 3-valent, so that in all these systems, too, a higher initial potential exists prior to the desired stable discharge potential.

The upper potential level of mixed oxide electrodes $MeO_x/MeO_y$ or of sulfide electrodes need not extend horizontally as for $AgO/Ag_2O$, it can also slope diagonally down to the lower potential plateau. Such a discharge characteristic is generally typical for mixed oxide electrodes such as, for example, $Bi_2O_x/Bi_2O_3$, whose upper oxide step is not strictly stoichiometrically constituted, but has a certain phase spread. In electrochemical reductions, oxygen atoms are continuously displaced from the crystal lattice of the higher oxide toward the lower phase boundary without changing the partial lattice of the metal atoms. Under conventional discharge conditions the crystallochemical transformations associated with the discharge process occur relatively slowly.

Through the measures in accordance with the invention the cell potential is stabilized from the beginning of discharge at the potential step of the stable lower chalcogenide.

We claim:

1. A galvanic element having a negative light metal or zinc electrode, an electrolyte, and a positive electrode positioned within a cell cup forming the positive current take-off and insulated from the positive electrode by an electrically non-conducting synthetic plastic layer covering the bottom and sidewall of the cup, the positive electrode being a chalcogenide of a metal having at least one higher and one lower valent state and which discharges in at least two steps, said chalcogenide selected from the group consisting of oxides of silver, bismuth and lead and sulfides of iron, cobalt and nickel, the element being characterized in that the positive electrode is connected to the positive current take-off cell cup solely through an electrically conductive connector whose contact surface with the electrode consisting of the higher-valent chalcongenide is so small that, for discharge currents between 0.2 and 15 microamperes and particularly between 0.3 and 10 microamperes the current density at the contact surface is of the order of magnitude of $10^{-1}$ milliamperes/cm$^2$, whereby even for current outputs of less than 15 microamperes the reduction of chalcogenide composition which determines the lower discharge potential into a chalcogen-poorest phase or into the metal itself takes place at the connector more rapidly than the oxidation of this metal or of this chalcogen-poorest phase into the higher-valent chalcogenide with which these are electrolytically conductively connected, and whereby the discharge potential of the cell corresponding to the higher-valent metal chalcogenide is suppressed during operation.

2. The element of claim 1 characterized wherein the positive electrode consists substantially of AgO and the negative electrode of zinc.

3. The element of claim 2 wherein the connector is of pure silver or of silvered nickel.

4. The element of claim 1 wherein the positive electrode consists substantially of bismuth oxide and the negative electrode of lithium.

5. The element of claim 1 wherein the positive electrode consists substantially of lead oxide and the negative electrode of lithium.

6. The element of claim 1 wherein the contact surface between the metal oxide and the connector is less than 10mm$^2$.

7. The element of claim 1 wherein the connector is formed solely by a single metal wire which superficially traverses the positive electrode.

8. The element of claim 7 wherein the element is a button cell and the wire has a diameter of about 0.1mm and diammetrically traverses the surface of the positive electrode.

9. The element of claim 1 wherein the connector is a single metal wire rod extending upwardly from the bottom of the cell cup through the plastic layer and into the interior of the positive electrode.

10. The element of claim 1 wherein the connector is the edge of a metal ring insulated at least on its lower side and extending into the surface of the positive electrode.

11. The element of claim 1 which has been subjected to an initial load current pulse.

12. The element of claim 1 which has not been subjected to surface reduction of the positive electrode.

* * * * *